Figure 1:
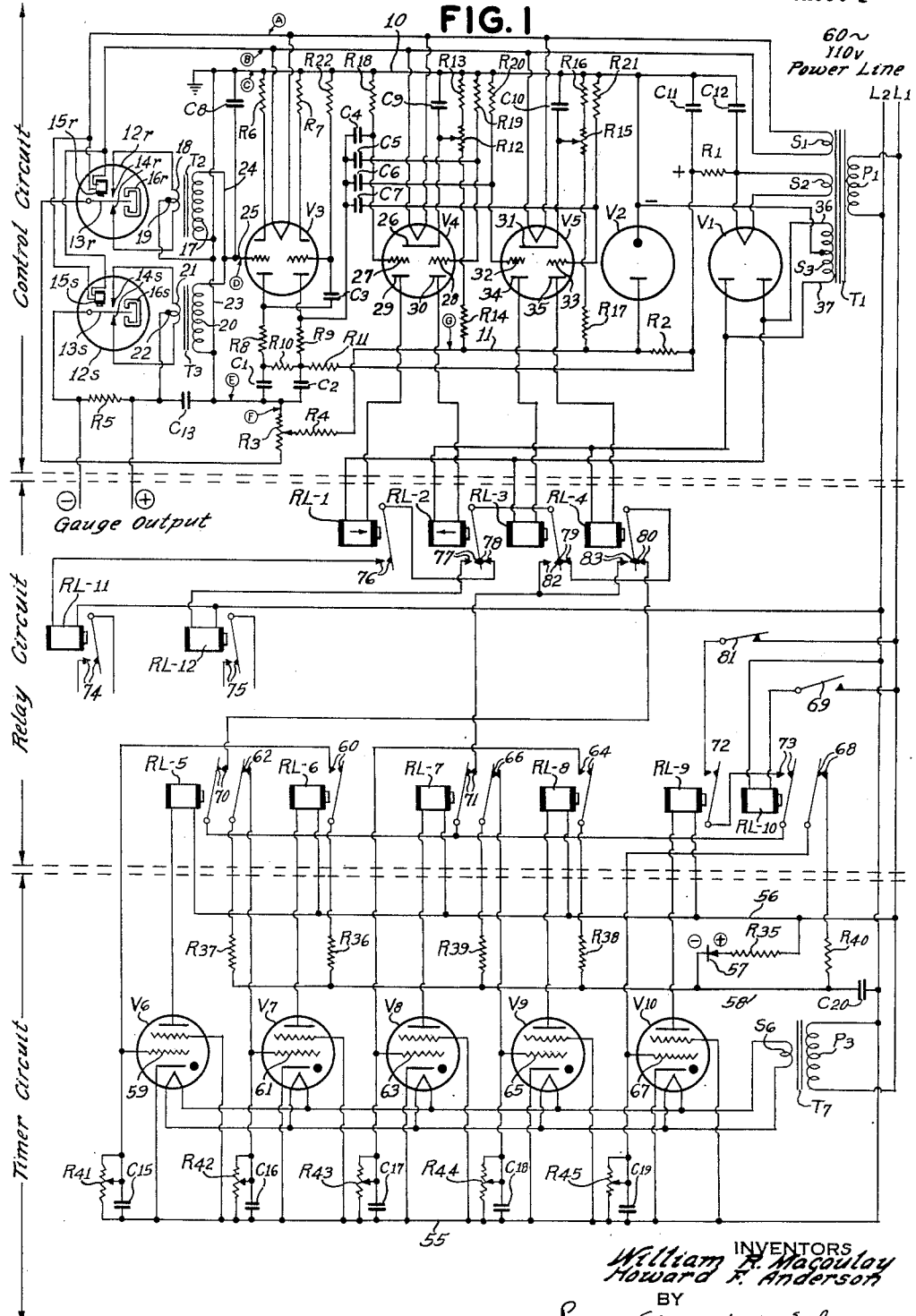

May 10, 1955  W. R. MACAULAY ET AL  2,708,254
RELAY CONTROL SYSTEM
Filed Feb. 8, 1950   3 Sheets-Sheet 2

INVENTORS
William R. Macaulay
Howard F. Anderson
BY
ATTORNEYS

May 10, 1955

W. R. MACAULAY ET AL 2,708,254

RELAY CONTROL SYSTEM

Filed Feb. 8, 1950

Sheet 3

INVENTORS
William R. Macaulay
Howard F. Anderson
BY
Pennie Edmonds Morton & Barrows
ATTORNEYS United States Patent Office 2,708,254
Patented May 10, 1955

2,708,254

RELAY CONTROL SYSTEM

William R. Macaulay, Waterbury, and Howard F. Anderson, Torrington, Conn., assignors to The American Brass Company, a corporation of Connecticut Application February 8, 1950, Serial No. 143,136

13 Claims. (Cl. 317—137)

This invention relates to an electrical control system. The system provides for the actuation of one or more main relays (through the contacts of which electrical apparatus of various types may be controlled), which main relays are energized in response to a signal voltage supplied by an electrical gauge. Each of the main relays is energized through the contacts of one or more other relays having actuating windings connected in a control circuit to which the gauge also is connected.

In its preferred and complete form, the control circuit employed in the new system is designed to discriminate between signals from the gauge that are above some predetermined reference value, and signals from the gauge that are below such value; and also to discriminate between gauge signals that depart from the reference value by only a small amount, and signals that depart therefrom by a relatively large amount; and the main relay or relays are energized in a way responsive to such discrimination.

The ability of the control circuit to discriminate between gauge signals which indicate a small departure from some reference value of the condition measured by the gauge, and gauge signals which indicate a relatively large departure from such value, is particularly advantageous in cases where the main relays actuate motors or other electrical apparatus by which the condition measured by the gauge is controlled, and where such motors or other apparatus serve to restore the reference value of the measured condition when the gauge indicates a departure therefrom. If the departure is small, the electrical apparatus generally should be actuated cautiously so as to restore the desired value of the measured condition without passing beyond it, i. e. without hunting; but if the departure from the reference condition is large, then the apparatus should be operated more energetically so as to restore such condition with a minimum lapse of time. To this end, in the control system of the invention, the main relay or relays through which the electrical apparatus is controlled are energized through timing relays having cyclically opening and closing contacts, whereby timed pulses of current are supplied to the electrical apparatus and any tendency for it to hunt is substantially eliminated. The ability of the control circuit to discriminate between small departures from the reference value of the condition mueasured by the gauge, and relatively large departures therefrom, is utilized to control a relay circuit which serves to effect energization of the main relay through the cyclically opening and closing contacts of the timer relay only when the departure from the reference value of the measured condition is small; and to shunt out this timer relay whenever such departure is large. The shunting of the timer relay may be by way of completely short-circuiting it; but often it is advantageous to shunt the first timer relay with a second similar timer relay having contacts which also cyclically open and close, but which are closed for a longer interval during each cycle than are the contacts of the first timer relay. In this manner the possibility of undesirable hunting is substantially completely prevented.

A particularly advantageous use of the new control system is in conjunction with rolling mills for rolling sheet or strip metal, for the purpose of maintaining the thickness of the metal being passed through the rolls as nearly uniform as possible. For example, in rolling copper and brass sheet or strip to thin gauges it is necessary after several successive passes of the metal through the rolls (each of which passes reduces its thickness somewhat) to anneal the metal before it can be rolled further. In commercial practice the annealed strip, or the strip from a previous rolling operation, commonly has some sections that are harder and other sections that are softer than the normal hardness of the strip. When relatively hard sections of the strip enter between the rolls on succeeding passes, the rolls must be screwed closer together in order to keep the thickness of the emerging strip constant, and when relatively soft sections enter between the rolls, they must be screwed apart to prevent making the strip too thin.

The discriminatory characteristics of the new control system enable it to control actuation of the screwdown motors by which the spacing of the rolls is adjusted in a way that in practice has been found to result in maintaining the gauge of the rolled metal remarkably close to the desired value. When an electrical gauge is used to measure continuously the thickness of the metal emerging from between the rolls, the control system of the invention discriminates between gauge signals indicating that the rolled metal is thicker than desired, and gauge signals indicating that the rolled metal is thinner than desired, and thereby is enabled to operate the roll screwdown motors in the proper direction. The further ability of the control system to discriminate between gauge signals indicating a small departure from the desired thickness, and gauge signals indicating a large departure therefrom, enables it to effect energization of the screwdown motors cautiously or vigorously, depending on whether the roll setting must be changed rapidly or slowly to compensate respectively for a large departure or a small departure in the thickness of the metal from a desired value. Finally, the control system of the invention substantially prevents any tendency for the corrections in roll setting from being accompanied by hunting action.

The new control system is adjustable with respect to the reference condition desired to be maintained, and with respect to the actual degree of departure therefrom, both small and large, to which it responds and with respect to which it discriminates. As applied to a rolling mill control, therefore, the new control system may readily be set for maintaining the gauge of the rolled metal at any desired value within wide limits, and for maintaining it at the chosen gauge value with any desired degree of accuracy (within a wide range of limits).

The control system of the invention, in its preferred and complete form, comprises three circuit units: (1) a control circuit to which the output of the electrical gauge is connected and which discriminates between gauge readings that are above and gauge readings that are below some preselected value, and further discriminates between gauge signals which depart by only a small extent from such preselected value, and gauge signals which depart therefrom by a relatively large extent; (2) a relay circuit through which the main relays are energized in response to the way in which the control circuit is set to discriminate between the various signals it receives from the gauge; and (3) a timer circuit for minimizing hunting by electrical apparatus controlled through the contacts of the main relays. The control circuit and the timer circuit each include the actuating coils of a series of relays, the contacts of which are connected together in the relay circuit.

The control circuit comprises a pair of impedances, preferably of the same kind, connected together, and an A. C. electrical power source. Circuit means are provided for impressing an alternating reference voltage (advantageously derived from the power source) on one of said impedances, and further circuit means are provided for impressing on the other of said impedances an alternating signal voltage 180° out of phase with said reference voltage. Means further are provided for maintaining both of said voltages in fixed phase relation with the voltage of the power source. An amplifier is provided with its input connected across said impedances. The impedances, the amplifier, and the circuitry by which they are connected together and to the sources of reference and signal voltages, constitute a source of control voltage for the balance of the control circuit.

The output of the amplifier is connected to the grid of a grid-controlled switching means having two anodes and at least one cathode. The actuating coil of a first primary response relay is connected between one of said anodes and one side of the power source, and the actuating coil of a second primary response relay is connected between the other of said anodes and the other side of said source. The necessary further circuit means required to complete the connections between the relay actuating coils and the switching means, and to complete the connections between the amplifier and said switching means, are of course also provided.

Because of the provision for maintaining the phase relation of the reference and signal voltages fixed with respect to that of the power source, the amplifier difference voltage between the reference voltage and the signal voltage (i. e. the control voltage) is maintained in one of two fixed phase relations with respect to the voltage of the power source, the first of said fixed phase relations differing from the second thereof by 180°. Further, because the anodes of the switching means are connected to opposite sides (i. e. points of opposite phase) of said power source, only one of the primary response relays is actuated when the reference voltage exceeds the signal voltage (i. e. when the control voltage is in, say, its first fixed phase relation with respect to the voltage of the power source), and only the other of said relays is actuated when the signal voltage exceeds the reference voltage (i. e. when the control voltage is in, say, the second of its fixed phase relations with respect to the voltage of the power source). Thus the circuit discriminates between voltage signals from the gauge that are greater in magnitude than the reference voltage and voltage signals from the gauge that are smaller in magnitude than the reference voltage.

To enable the control circuit to discriminate between voltage signals that depart to only a small extent from the reference voltage, and corresponding signals which depart to a relatively large extent from said reference voltage, a second grid-controlled switching means having two anodes and at least one cathode is also provided. The grid of said second switching means, like the grid of the first switching means, is connected to the output of the amplifier (i. e. to the control voltage source). The actuating coil of a first secondary response relay is connected between one anode of said second switching means and one side of the power source, and the actuating coil of a second secondary response relay is connected between the other anode of said second switching means and the other side of the power source. The cathodes of the two switching means are connected to their responsive grids through first and second variable voltage divider circuits, whereby the bias of said grids with respect to their corresponding cathodes may be independently adjusted. Appropriate further circuit means are of course provided for completing the connections between the secondary response relays, and the amplifier, to the second switching means. By suitable adjustment of the voltage dividers, the first switching means is conditioned to pass current through one or the other of the primary response relays whenever the signal voltage from the gauge departs from the reference voltage by only a small magnitude; and the second switching means is conditioned to pass current through one or the other of the secondary response relays whenever the signal voltage from the gauge departs from the reference voltage by a relatively large magnitude.

The timer circuit employed in the control system of the invention comprises a pair of timer relays having actuating coils connected to the anodes of a pair of gas-filled grid-controlled rectifier tubes of the type known as "Thyratrons." The timer circuit includes means for cyclically varying the bias voltage applied to the grids of said "Thyratrons," whereby the actuating coils of the timer relays are cyclically energized and de-energized, with the result that their contacts cyclically open and close.

In the relay circuit of the control system, the actuating coils of two main relays are connected through normally open contacts of the primary and secondary response relays and through the contacts of the timer relays to a power source. The first of the main relays is connected to the power source through the first primary response relay, and the second main relay is connected thereto through the second primary response relay. In each case the connection is completed through the contacts of the secondary response relays, both of which have normally closed contacts connected through the contacts of the first timer relay to the power source and normally open contacts connected through the contacts of the second timer relay to the power source. Thereby the first main relay is energized only when the first primary response relay is actuated by the control circuit, and the second main relay is energized only when the second primary response relay is actuated by the control circuit. In either case the main relay that is thus actuated is energized through either the first or second timer relay, depending on whether or not either of the secondary response relays is energized by the control circuit.

Thus in the complete control system, which of the two main relays is the one that is energized depends on whether the voltage signal from the gauge exceeds or is less than the reference voltage (because such condition determines whether the first or second of the primary response relays is actuated) and the way in which the main control relay is energized depends on whether the departure of the gauge voltage signal from the reference voltage is large or small (because such condition determines whether a secondary response relay is energized and thereby determines which of the two timer relays controls the action of the main relay).

Figure 2:
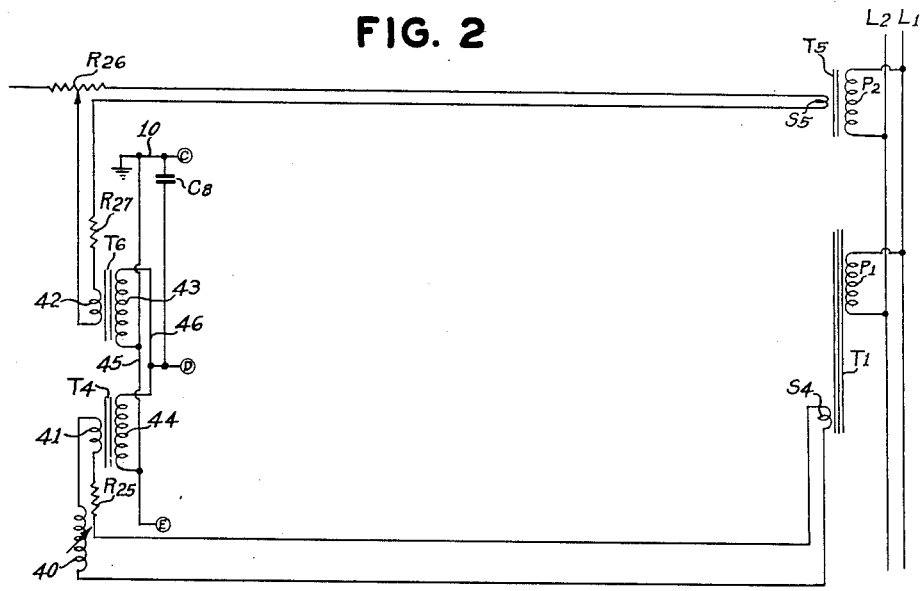
Figure 3:
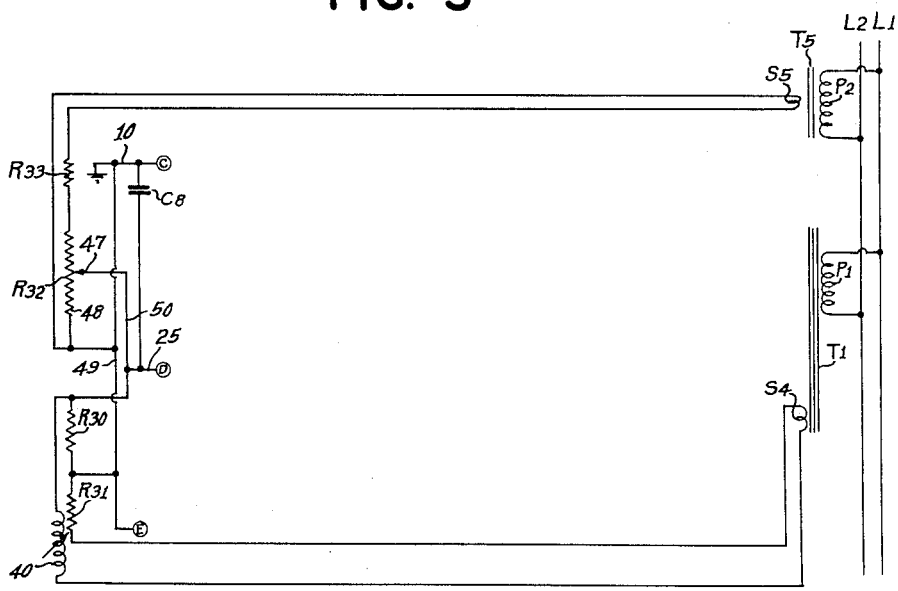
Figure 4:
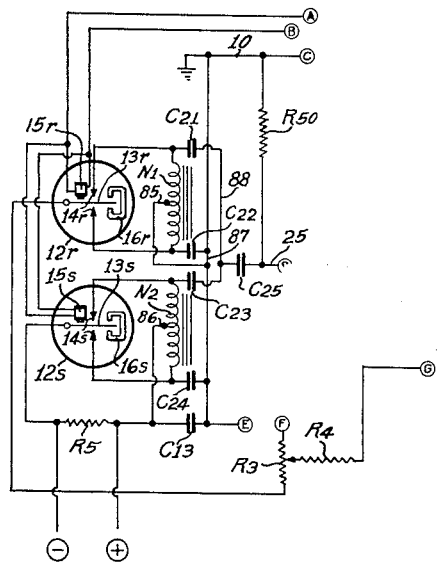
Figure 5:
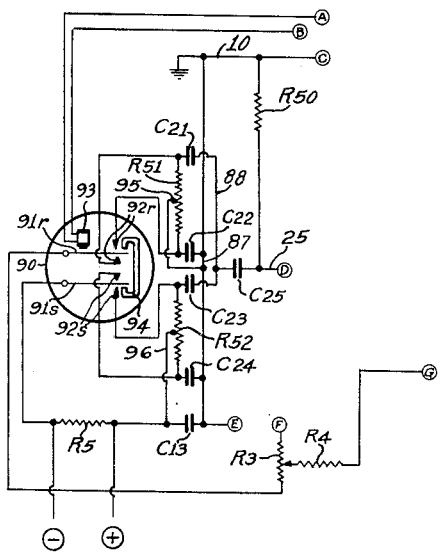

The new control system is described below with reference to the accompanying drawings, wherein Fig. 1 is a circuit diagram of a complete control system in accordance with the invention;

Figs. 2 and 3 show modifications that may be made in the signal input circuit for the control circuit of Fig. 1 for use with a gauge controlling an A. C. output; and Figs. 4 and 5 show still further modifications that may be made in the signal input circuit of the control circuit shown in Fig. 1 for use in connection with a gauge having a D. C. output.

The complete control system shown in Fig. 1 comprises a control circuit (shown above the upper pair of dashed lines), a timer circuit (shown below the lower pair of dashed lines), and a relay circuit (shown between the pairs of dashed lines).

The control circuit receives a voltage signal from an electrical gauge, compares it with a reference voltage, and actuates one or the other of a pair of primary response relays RL-1 and RL-2 in accordance with whether the voltage signal is greater or less in magnitude than the reference voltage; and it also actuates one or the other of a pair of secondary response relays RL–3 and RL–4 if the extent to which the signal voltage differs from the reference voltage is large.

The timer circuit cyclically energizes and deenergizes the actuating coils of a pair of timer relays RL–5 and RL–7, and includes circuit means for adjusting the durations of the "on" time and "off" time of these relays (that is, said circuit means enable control of the lengths of time for which the actuating coils of relays RL–5 and RL–7 are energized, and the lengths of time for which they are de-energized).

The relay circuit includes the connections by which two main relays RL–11 and RL–12 are connected through the contacts of the primary and secondary response relays and the timer relays to the two sides $L_1$ and $L_2$ of a power line.

Control circuit

The control circuit is supplied with power through a transformer $T_1$ having its primary winding $P_1$ connected to the two sides $L_1$, $L_2$ of an A. C. power line. The power transformer is provided with three secondary windings, two of which $S_1$ and $S_2$ provide low voltage heater current for the vacuum tubes used in the circuit, and the third of which $S_3$ provides the high voltage required for operating the control circuit. The high voltage secondary $S_3$ has its two end terminals connected to the anodes of a full-wave rectifier $V_1$, and is provided with a center tap connected to a grounded common conductor 10 which constitutes the negative side of the direct-current supply. The cathode of the rectifier is connected through resistances $R_1$ and $R_2$ to a conductor 11, which is thereby maintained at a substantial positive D. C. potential with respect to the grounded common conductor 10. A voltage stabilizer tube $V_2$ is connected between the common conductor 10 and the positively charged D. C. conductor 11 to maintain a substantially constant D. C. voltage difference between these two conductors.

The signal input to the control circuit is effected through a pair of converters $12_r$ and $12_s$. These converters each comprise a ferromagnetic armature $13_r$, $13_s$ arranged to vibrate between contacts $14_r$, $14_s$. The armatures are actuated by electromagnets $15_r$, $15_s$, which are connected to one of the low voltage secondary windings $S_1$ of the power transformer $T_1$. Polarized fields for the armatures are produced by permanent magnets $16_r$, $16_s$; and thereby, when the electromagnets $15_r$, $15_s$ are energized with alternating current, the armatures $13_r$, $13_s$ are caused to vibrate back and forth between their respective pairs of contacts $14_r$, $14_s$. Since both of the electromagnets are energized from the same A. C. power source, the armatures perforce vibrate in synchronism with each other and with a frequency equal to that of the A. C. power supplied to the power transformer $T_1$.

One of the converters $12_r$ serves to supply an A. C. reference voltage to an impedance in the form of a secondary winding 17 on a first signal transformer $T_2$. To this end, the armature $13_r$ of this converter is connected through a potentiometer $R_3$ and a fixed resistance $R_4$ to the positively charged D. C. conductor 11; and the contacts $14_r$ of this converter are respectively connected to the end terminals of the transformer primary winding 18. The transformer primary is provided with a center tap 19 which is connected to the grounded common conductor 10 of the D. C. circuit. When the armature $13_r$ is caused to vibrate, a voltage is impressed alternately between first one end and then the other of the transformer primary and its center tap. In consequence, a current of a magnitude determined by the setting of the potentiometer $R_3$ flows alternately in one direction and then the other through the primary winding, and induces an A. C. reference potential across the terminals of the secondary winding 17 on the transformer $T_2$.

The second converter $12_s$ serves to supply an A. C. signal voltage to an impedance in the form of a secondary winding 20 on a second and similar signal transformer $T_3$. The signal voltage is obtained as a D. C. voltage output from any chosen electrical gauge, and is connected across the terminals of a load resistor $R_5$. The side of the load resistor which is connected to the negative output terminal of the gauge is connected to the armature $13_s$ of the converter $12_s$. The contacts $14_s$ of this converter are respectively connected to the end terminals of the primary winding 21 of the transformer $T_3$; and a center tap 22 of this primary is connected to the same terminal of the load resistor $R_5$ as is the positive output terminal of the gauge. When the armature $13_s$ is caused to vibrate, a voltage is impressed between first one end and then the other of the primary winding 22 and its center tap. As a result, a current of magnitude determined by the magnitude of the signal voltage flows alternately in opposite directions through the primary winding 21 and induces an A. C. signal voltage across the terminals of the secondary winding 20 of the signal transformer $T_3$.

As previously noted, the armatures $13_r$ and $13_s$ of both converters vibrate in synchronism with each other and with the same frequency as that of the power supply delivered to the power line $L_1$, $L_2$ to which the power transformer $T_1$ is connected. In consequence, the alternating currents flowing through the signal transformer primaries 18 and 21, and the A. C. reference and signal voltages impressed respectively on the transformer secondaries 17 and 20, are all of the same frequency as the power supply itself. The similar secondaries 17 and 20 of the signal transformers are connected together by conductors 23 and 24, so that the reference and signal voltages induced in them are effectively 180° out of phase by reason of the opposite polarities impressed on armatures $13_r$ and $13_s$. Hence if the reference voltage and the signal voltage are of the same magnitude, the vector sum of voltage, viz., "difference voltage," across the conductors 23 and 24 (or points C and D) is substantially zero. If, however, the signal voltage is either larger or smaller than the reference voltage, then an A. C. potential will appear across the conductors 23 and 24, the magnitude of which potential depends on the magnitude of the difference between the reference and signal voltages. These voltages will be of the same frequency. One of the conductors 23 is connected to the grounded common conductor 10, so that any potential developed between the conductors 23 and 24 appears in the form of a voltage alternating above and below ground potential on the conductor 24. The frequency of this potential is the same as that of the power supply, and its phase relation with respect to that of the power supply is fixed by the synchronized vibration of the armatures $13_r$ and $13_s$ with each other and with the alternations of the power supply.

It is preferable that the pair of impedances on which the reference and signal voltages are impressed be of the kind, viz., two inductances, two resistances, or even two condensers. If the A. C. control voltage across the conductors 23 and 24 is exactly in phase with the voltage of the power supply when the signal voltage exceeds the reference voltage, then when conversely the reference voltage exceeds the signal A. C. control voltage, the voltage across the conductors 23 and 24 will be 180° out of phase with the voltage of the power supply. It is thus apparent that the voltage appearing on the conductor 24 with respect to ground (which constitutes a control voltage for the balance of the control circuit) displays a phase shift of 180° whenever the signal voltage shifts from a smaller to a greater magnitude than the reference voltage, and vice versa; and this phase shift of the voltage appearing on the conductor 24 with respect to ground bears either a fixed relation to the phase of the voltage of the power supply (e. g. the one is in phase with the other), or a phase relation 180° from said fixed relation (e. g. the one is 180° out of phase with the other).

The conductor 24 is connected by a lead 25 to the input grid of a double triode V₃ which serves as a two-stage amplifier. The two cathodes of this amplifier are connected through resistances R₆ and R₇ respectively to the grounded common conductor 10. The two anodes of this amplifier are connected through a filter and coupling network of resistors R₈, R₉, R₁₀ and R₁₁ and capacitors C₁ and C₂ to the positive side of the D. C. power supply derived from the rectifier V₁. The anode of the first (input) stage of the amplifier V₃ is coupled through condenser C₃ and resistor R₂₂ to the grid of the second (output) stage thereof; and the anode of said output stage is coupled to tubes V₄ and V₅ through a bank of four condensers C₄, C₅, C₆ and C₇ and resistors R₁₈, R₁₉, R₂₀ and R₂₁.

The purpose of the amplifier V₃ is to amplify the control voltage (that is, the voltage difference appearing between the conductors 23 and 24 whenever the signal voltage differs from the reference voltage), and its design to accomplish this purpose is conventional. It will be noted that the amplified voltage delivered from the output stage of the amplifier double triode V₃, having been twice reversed in phase, preserves the phase difference of 180° between the voltage with respect to ground developed on the conductor 24 when the signal voltage exceeds the reference voltage, as compared with when the reference voltage exceeds the signal voltage. Thus, the amplifier does not change the phase of the control voltage.

The amplified control voltage with respect to ground delivered from the output stage of the amplifier V₃ controls the actuation of a pair of primary response relays RL-1 and RL-2 through grid-controlled vacuum tube switching means V₄; and further controls the actuation of a pair of secondary response relays RL-3 and RL-4 through a second grid-controlled switching means V₅. The first such switching means shown in Fig. 1 comprises a vacuum tube having a cathode 26, two grids 27 and 28, and two anodes 29 and 30. The second such switching means similarly comprises a vacuum tube having a cathode 31, two grids 32 and 33, and two anodes 34 and 35.

The cathode 26 of the first vacuum tube switch V₄ is connected to the slider of a potentiometer R₁₂, which in series with a pair of resistances R₁₃ and R₁₄ forms a voltage divider connected between the grounded common conductor 10 and the D. C. positive conductor 11. The cathode 31 of the second vacuum tube switch V₅ is similarly connected to the slider of a potentiometer R₁₅, which in series with another pair of resistances R₁₆ and R₁₇ forms a second voltage divider connected between the grounded conductor 10 and the positively charged D. C. conductor 11.

The grids 27, 28, 32 and 33 of the vacuum tube switches V₄ and V₅ are connected respectively through resistors R₁₈, R₁₉, R₂₀ and R₂₁ to the grounded common conductor 10 and further are connected respectively to the condensers C₄, C₅, C₆ and C₇ in the output from the amplifier V₃. Thus an A. C. potential with respect to ground is impressed on all of the grids of the two vacuum tube switches V₄ and V₅ whenever an A. C. control voltage appears across the conductors 23 and 24 in response to a difference in magnitude between reference and signal voltages, and the magnitude of such potential depends on the magnitude of the A. C. voltage difference across said conductors 23 and 24.

One of the anodes 29 of the first vacuum tube switch V₄ is connected in series with the actuating coil of the first primary response relay RL-1 to one side or phase point 36 of the power transformer high voltage secondary S₃, and one anode 34 of the other vacuum tube switch V₅ is connected in series with the actuating coil of the first secondary response relay RL-3 to this same side of the power transformer secondary S₃. The other anodes 30 and 35 of the vacuum tube switches are respectively connected in series with the actuating coils of the second primary and second secondary response relays RL-2 and RL-4 to the opposite side or phase point 37 of the high voltage secondary S₃ of the power transformer. Since the center tap of the secondary winding S₃ is connected to the grounded common conductor 10, an A. C. potential with respect to ground is impressed on all of the anodes of the vacuum tube switches V₄ and V₅, but the anode potential on two of these anodes 29 and 34 is 180° out of phase with the potentials impressed on the other two anodes 30 and 35.

The D. C. bias potential with respect to ground that is impressed on the cathodes 26 and 31 of the two vacuum tube switches is always positive, but its magnitude may be varied over quite wide limits by adjustment of the sliders of the potentiometers R₁₂ and R₁₅. Normally these sliders are adjusted so that when the grids 27, 28, 32 and 33 of the vacuum tube switches are all at ground potential, substantially no current flows from the cathodes 26 and 31 to any of the anodes 29, 30, 34 and 35 (even when these anodes are positive); and normally the potentiometer R₁₅ through which the D. C. bias potential on the cathode of the second switching means V₅ is controlled is adjusted so as to require a substantially greater positive (or a substantially less negative) potential on the grids 32 and 33 of the second switching means, in order to permit current to flow to the anodes 34 and 35 of this tube, than is required in the case of the first vacuum tube switching means V₄.

Whenever a control voltage appears across the conductors 23 and 24 due to a difference in magnitude between the reference and signal voltages induced in the secondaries 17 and 20 of the signal transformers T₂ and T₃, this voltage is amplified in the twin amplifier V₃ and is impressed through the condensers C₄, C₅, C₆ and C₇ on all the grids 27, 28, 32 and 33 of the vacuum tube switches. For the reasons given above, the resulting A. C. potential on these grids is either substantially in phase with the voltage of the power source, or 180° out of phase therewith. Since the A. C. potentials on the anodes 29, 30, 34 and 35 of the vacuum tube switches is derived directly from the power transformer, therefore, in each vacuum tube switch, the A. C. potential on one of the anodes therein will be substantially in phase with the A. C. grid potential, and the potential on the other anode in the same tube will be 180° out of phase with the grid potential. Only the anode carrying an A. C. potential in phase with the A. C. grid potential will carry current when the grid potential at some point in its cycle is sufficiently positive to permit current to flow through the tube. If, for example, the signal voltage exceeds the reference voltage, and thereby the potentials on the grids 27, 28, 32 and 33 of the vacuum tube switches are all in phase with the A. C. potentials impressed on the anodes 29 and 34, then perforce the potentials on the anodes 30 and 35 of the vacuum tube switches V₄ and V₅ will be 180° out of phase with said grid potential, and only the first primary and first secondary response relays RL-1 and RL-3 may become energized. If, on the other hand, the reference voltage exceeds the signal voltage, then as described above the phase of the A. C. potential impressed on all grids of the vacuum tube switches V₄ and V₅ will be altered by 180°; but since this change in the phase of the grid potential takes place without any change in the phase relation of the A. C. potentials impressed on the anodes 29, 30, 34 and 35 of the vacuum tube switches, then only the second primary and second secondary response relays RL-2 and RL-4 may become energized. It follows, therefore, that whether the first or second of the primary response relays RL-1 and RL-2 is energized depends on whether the signal voltage exceeds or is less than the reference voltage; and the same factor controls whether the first or second of the secondary response relays RL-3 and RL-4 may become energized. Thus the circuit effectively discriminates between a signal voltage that exceeds the reference voltage, and a signal voltage that is less than the reference voltage, and correspondingly permits actuation of one or the other (but not both) of the relays in each of the primary and secondary response pairs of relays.

By adjustment of the potentiometers $R_{12}$ and $R_{15}$, it is possible to predetermine the magnitude of the control voltage which, when impressed on the grids of the first vacuum tube switch $V_4$, is sufficient to permit enough current to flow in the anode circuit thereof to effectuate energization of one or the other of the primary response relays, and independently to predetermine the magnitude of the control voltage which, when impressed on the grids of the second vacuum tube switch $V_5$, is sufficient to permit enough current to flow in the anode circuit thereof to effectuate actuation of one or the other of the secondary response relays. In a control system of the character illustrated in Fig. 1, the potentiometer $R_{12}$, by which the cathode potential of the first vacuum tube switch $V_4$ is controlled, is normally adjusted so that a small A. C. potential on the grids 27 and 28 is sufficient to permit the flow of enough current to energize one or the other of the primary response relays RL–1 and RL–2. The potentiometer $R_{15}$ controlling the cathode bias of the second vacuum tube switch $V_5$ is, however, normally adjusted so that a relatively large A. C. grid potential is required in order for sufficient current to flow through one or the other of the actuating coils of the secondary response relays RL–3 and RL–4 to energize the same. Thus, by appropriate adjustment of the potentiometer $R_{12}$ and $R_{15}$, the control circuit is enabled to discriminate between a small departure of signal voltage from reference voltage (which results in actuation of only one of the primary response relays, but not in actuation of one of the secondary response relays), and a relatively large departure of signal voltage from reference voltage (which results in actuation of one of the secondary response relays, along with actuation of the corresponding one of the primary response relays).

*Control circuit—alternative arrangements for use with A. C. gauges*

The control circuit described above is designed to receive a D. C. signal voltage (impressed across the load resistor $R_5$) from the electrical gauge. Many different types of electrical gauges do in fact deliver a D. C. signal of magnitude related to the magnitude of the quantity which the gauge measures. Among gauges for measuring continuously the thickness of a traveling sheet of metal, for example, X-ray gauges and continuous reading mechanically-actuated micrometers may be designed to produce a D. C. voltage of magnitude related to the actual thickness of the metal (or sometimes of magnitude related to the extent to which the thickness of the metal departs from a standard specimen). Beta-ray gauges for providing a continuous indication of the thickness of a traveling sheet of metal are also of this type. Such gauges basically comprise an ionization gauge having a D. C. potential impressed across its electrodes, and a beta-ray source (e. g. a natural or artificially produced radioactive beta emitter) which projects a beam of beta rays through the sheet metal to the ionization gauge. The resistance between the electrodes of the ionization gauge varies with the intensity of the beta-ray beam impinging on it, and this in turn varies with the extent to which the beam of beta rays is attenuated in passing through the metal.

There are, on the other hand, electrical gauges which produce an A. C. signal voltage related in magnitude to the magnitude of the quantity to be measured, and which can be arranged so that the frequency of such signal voltage, and its phase relation to the voltage of the power supply, is made correct for actuating the control circuit. For example, United States Patent No. 1,969,536 to H. A. Winne describes a mechanically operated variable reluctance gauge for thickness-measuring purposes; and simple variable resistance gauges which include an element that varies in electrical resistance with changes in the condition being measured (temperature, for example) exemplify the type of gauges that can control the magnitude of an A. C. signal voltage in relation to the magnitude of such measured condition.

Figs. 2 and 3 show modifications of the power supply transformers and of the signal input end of the control circuit described above for adapting it to the use of a variable resistance gauge, or a variable reluctance gauge, or other similar gauge controlling (or producing) an A. C. output of the proper frequency and phase relation with respect to the power supply. The circuits of Figs. 2 and 3 are designed to be incorporated in the control circuit of Fig. 1 by removing from the latter all circuit elements to the left of the circled letters A, B, C, D, E, F and G, and connecting at the points C, D and E of Fig. 1 the correspondingly lettered conductors of Figs. 2 and 3.

In the case of the circuit shown in Fig. 2, the power transformer $T_1$ which supplies the operating power to the control circuit is provided with an additional secondary winding $S_4$, one terminal of which is connected to one of the electrodes of a variable reluctance gauge 40. (A variable reluctance gauge is shown by way of example, but any other type of gauge developing or controlling an A. C. signal voltage may of course be used.) The other terminal of the gauge is connected in series with a primary winding 41 of a signal transformer $T_4$ and with a current limiting resistor $R_{25}$ to the other side of the power transformer secondary $S_4$.

An auxiliary power transformer $T_5$ having its primary $P_2$ connected to the power line $L_1$, $L_2$ is provided with a secondary winding $S_5$ which is connected in series with a potentiometer or rheostat $R_{26}$, the primary winding 42 of a reference voltage transformer $T_6$, and a current limiting resistor $R_{27}$.

When the auxiliary power transformer $T_5$ is energized, an alternating reference voltage is induced across the terminals of an impedance in the form of secondary winding 43 on the transformer $T_6$. The magnitude of this potential may be preset at a desired value by adjustment of the potentiometer or rheostat $R_{26}$. The frequency of the reference voltage induced in the transformer secondary 43 is the same as that of the power supply, and its phase relation is of course fixed with respect thereto.

An A. C. signal voltage is induced in a second impedance in the form of secondary winding 44 on the signal transformer $T_4$. The magnitude of this signal voltage depends on the value, at any particular time, of the impedance of the variable reluctance gauge 40. Since the A. C. potential applied across the terminals of the gauge is derived from the same power supply line $L_1$, $L_2$ as provides for inducing the reference voltage in the secondary winding 43, the signal voltage induced in the secondary winding 44 is of the same frequency as and of fixed phase relation with respect to the reference voltage. If required to assure optimum phase relation between signal and reference voltages, a phase adjuster of conventional design may be incorporated either in the circuit leading from the secondary $S_4$ of the main power transformer to the primary 41 of the first signal transformer $T_4$, or in the circuit leading from the secondary $S_5$ of the auxiliary power transformer $T_5$ to the primary 42 of the second signal transformer $T_6$.

The signal transformer secondaries 43 and 44 are of the same kind of impedance, viz., are both inductances, and are connected together by conductors 45 and 46 so that the reference and signal voltages induced in these secondaries are effectively 180° out of phase by reason of the opposite polarities impressed on armatures $13_r$ and $13_s$ (Fig. 1). Accordingly, if the reference and signal voltages are of the same magnitude, the vector sum of potentials across the conductors 45 and 46 are zero. If, however, the reference voltage across the terminals of the secondary 43 exceeds or is less than the signal voltage induced in the secondary 44, then the vector sum or "difference voltage" between them will appear as a potential across the conductors 45 and 46. Since the conductor 45 is connected to the grounded common conductor 10, as previously described in connection with the control circuit of Fig. 1, the phase of such potential appearing on conductor 46 whenever the reference voltage exceeds the signal voltage will differ by 180° with respect to the phase of the power supply voltage, from the phase of the potential appearing on the conductor 46 when the signal voltage exceeds the reference voltage. Thus the frequency and phase relation of the potential appearing on the conductor 46 in the circuit of Fig. 2 are the same with respect to the power supply as previously described with reference to the conductor 24 of the control circuit of Fig. 1; and by connecting this conductor 46 (at the circled letter D) to the grid of the first stage of the amplifier $V_3$ of the control circuit of Fig. 1, that circuit is enabled to operate, in the manner described above, to discriminate between signal voltages that exceed the reference voltage and signal voltages that are less than the reference voltage.

An alternative to the circuit of Fig. 2, in which resistances rather than transformer secondaries are employed as the impedances of the same kind across which the reference and signal voltages are produced, is shown in Fig. 3. In the circuit of Fig. 3, the additional secondary winding $S_4$ on the power transformer $T_1$ is connected in series with the variable reluctance gauge 40, an impedance in the form of a voltage dropping resistor $R_{30}$, and a current limiting resistor $R_{31}$. The auxiliary power transformer $T_5$ has its secondary $S_5$ connected in series with a voltage dropping potentiometer winding $R_{32}$ and a current limiting resistor $R_{33}$.

When the auxiliary transformer $T_5$ is energized, an A. C. reference voltage of magnitude predetermined by the setting of the potentiometer slider 47 is produced across that portion of the potentiometer winding $R_{32}$ between its slider 47 and its lower terminal 48. The frequency and phase of this reference voltage is of course substantially the same as that of the voltage of the power supply from which it is derived. The magnitude of the reference voltage is determined by the setting of the potentiometer slider 47.

When the main power transformer $T_1$ is energized, an A. C. signal voltage is produced across the terminals of the voltage dropping resistor $R_{30}$, and likewise its frequency is the same as and its phase relation is fixed with respect to that of the power supply. The magnitude of the signal voltage depends on the value of the impedance, at any moment, of the variable reluctance gauge.

The resistances across which the reference and signal voltages are produced are connected together by conductors 49 and 50 so that the voltages across them are 180° out of phase; and one of these conductors 49 is connected at the circled letter C to the grounded common conductor 10 of the control circuit shown in Fig. 1. Whenever these voltages are of the same magnitude, the potential across the conductors 49 and 50 is zero. If the reference voltage differs from the signal voltage, however, the "difference potential" appears across the conductors 49 and 50. For the reasons heretofore given in describing the control circuit of Fig. 1, the phase of such difference potential shifts by 180° with respect to the phase of the power supply voltage whenever the reference voltage shifts from a value less than to a value greater than the signal voltage, and vice versa. Accordingly, by connecting the conductor 50 at the circled letter D by the grid lead 25 to the amplifier $V_3$ of the control circuit shown in Fig. 1, that control circuit is caused to operate in the manner previously described to discriminate between signal voltages that exceed the reference voltage and signal voltages that are less than the reference voltage.

*Control circuit—alternative arrangements for use with D. C. gauges*

Figs. 4 and 5 show two of the various modifications that can be made in the signal input end of the control circuit previously described with respect to Fig. 1 for use with gauges producing a D. C. signal. The circuits of Figs. 4 and 5 may be incorporated in the control circuit of Fig. 1 by removing from the latter all circuit elements to the left of the points indicated by the circled letters A, B, C, D, E, F and G, and by connecting at such points the correspondingly lettered points of the circuit of either of Fig. 4 or 5.

Referring first to Fig. 4, the modification there shown involves essentially the substitution of simple iron core signal and reference voltage dropping inductances $N_1$ and $N_2$ for the signal transformers $T_2$ and $T_3$, respectively, of Fig. 1, together with such changes in circuitry as are necessitated by this substitution. As shown, the modification of Fig. 4 involves the use of a pair of converters $12_r$ and $12_s$ which are identical in construction to the corresponding converters of Fig. 1, and like reference numerals are applied to them. Also the nature of the connections of the converters of Fig. 4 to the power transformer $T_1$, to the potentiometer $R_3$, and to the load resistor $R_5$ are the same as previously described above with regard to Fig. 1.

In the circuit of Fig. 4 the contacts $14_r$ of the reference voltage converter $12_r$ are respectively connected to the end terminals of the reference voltage dropping inductance $N_1$. This inductance is provided with a center tap 85 which is connected to the grounded common conductor 10, so that when the armature $13_r$ is caused to vibrate, an alternating reference voltage of constant magnitude determined by the setting of the slider on the potentiometer $R_3$ is developed across its end terminals. Similarly, the contacts $14_s$ of the signal voltage converter $12_s$ are connected to the end terminals of the signal voltage dropping inductance $N_2$, and this inductance is provided with a center tap 86 which is connected to the load resistor $R_5$ on the side opposite that to which the armature $13_s$ of the signal converter is connected. Hence when the armature $13_s$ is vibrated, an alternating signal voltage, of variable magnitude determined by the magnitude of the D. C. signal voltage from the gauge impressed across the resistor $R_5$, is developed across the terminals of the inductance $N_2$. Since the armatures $13_r$ and $13_s$ of both converters vibrate in synchronism with each other and with the same frequency as the power supply, the alternating voltages appearing across the end terminals of the inductances $N_1$ and $N_2$ are of the same frequency as, and are fixed in phase relation with respect to, the power supply voltage.

The inductances $N_1$ and $N_2$ are connected together through condensers $C_{21}$, $C_{22}$, $C_{23}$, and $C_{24}$, by conductors 87 and 88, so that the alternating reference and signal voltages developed across their respective end terminals are placed effectively 180° out of phase. Therefore, if the alternating signal voltage is of the same magnitude as the alternating reference voltage, the resulting alternating difference voltage that appears across the conductors 87 and 88 is zero; but if the signal voltage is either larger or smaller than the reference voltage, an alternating potential of magnitude dependent on the magnitude of the difference between the reference and signal voltages will appear across the conductors 87 and 88. The phase relation of this potential with respect to the power supply shifts by 180° when the magnitude of the signal voltage shifts from a value that exceeds to a value that is smaller than the reference voltage. This potential is therefore a suitable control voltage for impressing (by a connection at the circled letter D) on the grid of the first stage of the amplifier $V_3$ of Fig. 1, to enable the control circuit to discriminate between signal voltages that are smaller than the reference voltage, and signal voltages that are larger than the reference voltage.

The condensers $C_{21}$ to $C_{24}$ in the circuit of Fig. 4 serve to isolate the inductances and the contacts $14_r$ and $14_s$ of the converters from direct connection (except through the converter armatures $13_r$ and $13_s$) to the D. C. circuit of the control system. In order to compensate for the phase shift produced by these condensers in the alternating control voltage appearing across the conductors 87 and 88, a condenser $C_{25}$ is interposed in the connection between the ungrounded conductor 88 and the grid of the first stage of the amplifier $V_3$ (which is connected to the grid lead 25 at the circled letter D). Correspondingly, a grid leak resistor $R_{50}$ connects the grid lead conductor 25 to the grounded common conductor 10 of the control circuit in place of the condenser $C_8$ shown in Fig. 1.

The control circuit modification shown in Fig. 5 is generally similar to that just described with reference to Fig. 4, except that signal and reference voltage dropping resistors $R_{51}$ and $R_{52}$ are used as like impedances in place of the inductances $N_1$ and $N_2$, and a single converter of modified mechanical design is used in place of the two converters previously described.

The converter 90 of Fig. 5 comprises a single vibrating armature carrying two conducting members $91_r$ and $91_s$ which are electrically insulated from each other. One of the conducting members $91_r$ is mounted to oscillate between a first pair of contacts $92_r$, and the other conducting member $91_s$ is arranged to oscillate between a second pair of contacts $92_s$. The armature, with the conducting members $91_r$ and $91_s$ which it carries, is caused to vibrate by a single electromagnet 93 which is connected to the secondary winding $S_1$ of the power transformer (by connection of its leads at the circled letters A and B of Fig. 4 to the correspondingly lettered points on the conductors leading from said secondary winding as shown in Fig. 1). A single polarizing magnet 94 is provided to insure oscillation of the converter armature at the same frequency as the power supply to which the electromagnet 93 is connected. Since the conducting members $91_r$ and $91_s$ are mechanically mounted on a single armature structure, they perforce vibrate in synchronism.

One of the conducting members $91_r$ serves to impress an alternating reference voltage across the end terminals of the reference voltage dropping resistor $R_{51}$. To this end, the conducting member $91_r$ is connected to the potentiometer $R_3$, and the contacts $92_r$ between which this conducting member oscillates are connected to the end terminals of said resistor $R_{51}$. The resistor itself is provided with a center tap 95 which is connected to the grounded common conductor 10. Hence when the converter is actuated, current flows alternately in one direction and then the other through the reference voltage dropping resistor $R_{51}$. As a result, an alternating reference voltage of constant magnitude (the value of which is determined by the setting of the slider on the potentiometer $R_3$) appears across the end terminals of the resistor $R_{51}$.

Similarly, the second conducting member $91_s$ of the converter is connected to one side of the load resistor $R_5$ across which the terminals of the gauge are connected; and the contacts $92_s$ between which said conducting member oscillates are connected to the terminals of the signal voltage dropping resistor $R_{52}$. A center tap 96 with which the signal voltage dropping resistor $R_{52}$ is provided is connected to the load resistor $R_5$ on the side opposite that to which the conducting member $91_s$ is connected. Hence, when conducting member $91_s$ vibrates, an alternating signal voltage, of variable magnitude determined by the gauge connected across the load resistor $R_5$, appears across the end terminals of the signal voltage dropping resistor $R_{52}$.

It is evident from the foregoing that electrically the converter 90 is the full equivalent of the two converters $12_r$ and $12_s$ described above with reference to each of Figs. 1 and 4, and that it operates electrically in the same manner to impress alternating references and signal voltages across the resistors $R_{51}$ and $R_{52}$. Owing to the fact that the two conducting members $91_r$ and $91_s$ vibrate in synchronism with each other, and with the same frequency as the power supply, said alternating voltages are of the same frequency as, and are fixed in phase relation with respect to, the voltage of the power supply.

The resistors $R_{51}$ and $R_{52}$ are connected together by the same circuitry as that described above with reference to Fig. 4, including the condensers $C_{21}$, $C_{22}$, $C_{23}$ and $C_{24}$, and the conductors 87 and 88. When the reference voltage appearing across the resistor $R_{51}$ equals the signal voltage appearing across the resistor $R_{52}$, the magnitude of the alternating control voltage developed across the conductors 87 and 88 is zero, by reason of the opposite polarities impressed on armatures $91_r$ and $91_s$. If, however, the signal voltage differs in magnitude from the reference voltage, then an alternating control voltage of the same frequency as that of the power supply, and of magnitude determined by the difference in magnitude between signal and reference voltages, appears across the conductors 87 and 88. If the A. C. control voltage across the conductors 87 and 88 is exactly in phase with the voltage of the power supply when the signal voltage exceeds the reference voltage, then when, conversely, the reference voltage exceeds the signal voltage the A. C. control voltage across conductors 87 and 88 will be 180° out of phase with the voltage of the power supply. By connecting the ungrounded conductor 88 through the grid lead 25 (at the circled letter D) to the grid of the first stage of the amplifier $V_3$ (of the control circuit shown in Fig. 1), the control circuit is enabled to function as previously described to discriminate between signal voltages that are less than the reference voltage and signal voltages that are greater than the reference voltage.

The phase shifting condenser $C_{25}$ connected between the conductor 88 and the amplifier grid lead 25 is provided (as previously described with reference to Fig. 4) to compensate for the phase shift effected by the condensers $C_{21}$ to $C_{24}$ (which in turn serve to isolate the contacts $92_r$ and $92_s$ from any direct connection with the D. C. circuit of the control, save only through the conducting members $91_r$ and $91_s$). Also, the grid leak resistor $R_{50}$, as previously mentioned with respect to Fig. 4, is substituted in this circuit for the condenser $C_8$ that is employed in the control circuit of Fig. 1.

The circuit modification of Fig. 5 (like that of Fig. 4) is incapable of magnifying the value of the control voltage developed across the conductors 87 and 88 beyond the actual difference between reference and signal voltages. The resistors $R_{51}$ and $R_{52}$ are, however, physically much simpler devices than the transformers $T_2$ and $T_3$ of Fig. 1 which they replace, and some physical simplification is further effected by using the single converter 90 having a double set of conducting members $91_r$, $91_s$ and contacts $92_r$, $92_s$. For these reasons, the signal input circuit of Fig. 5 is advantageous for use in combination with a gauge developing or controlling a sufficiently large D. C. signal voltage so that the voltage-multiplying ability of transformed (e. g. $T_2$ and $T_3$ of Fig. 1) is not necessary for satisfactory operation of the control.

Timer circuit

The purpose of the timer circuit shown in Fig. 1 is to actuate two timer relays RL–5 and RL–7, in such manner as to effect cyclic opening and closing of those of their contacts that are incorporated in the relay circuit of the complete control system. Any timer arrangement for accomplishing this result may be employed. A purely mechanical arrangement for opening and closing the contacts that are included in the relay circuit may be achieved if desired, but particularly satisfactory results have been employed using the relay circuit shown, partly because the "on" and "off" periods are adjustable over a considerable range, and this relay circuit is described herein for the purpose of providing a full disclosure of an operative embodiment of the complete control system of the invention.

The timer circuit comprises five dual grid "Thyratrons" (i. e. gas-filled grid-controlled rectifiers) $V_6$, $V_7$, $V_8$, $V_9$ and $V_{10}$, the heaters of which are energized from a secondary winding $S_6$ on a timer power transformer $T_7$, the primary winding $P_3$ of which is connected to the power supply line $L_1$, $L_2$.

The cathodes of all of the "Thyratrons" are directly connected to an A. C. common conductor 55 which in turn is connected to one side $L_2$ of the power line, and the screen grids of the "Thyratrons" likewise are directly connected to this common conductor 55. The anodes of the "Thyratrons" $V_6$ to $V_{10}$ are respectively connected through the actuating coils of a series of relays RL–5, RL–6, RL–7, RL–8 and RL–9 to a common conductor 56 connected to the other side $L_1$ of the power line.

A dry disk (or other) rectifier 57 in series with a current limiting resistor $R_{35}$ is connected between the common conductor 56 and a common conductor 58 for the purpose of establishing a negative D. C. bias potential on conductor 58 to which the control grids are connected. The control grid 59 of the first "Thyratron" $V_6$ is connected to the D. C. common conductor 58 through a resistor $R_{36}$ and normally open contacts 60 of the relay RL–6 whose coil is connected to the anode of the second "Thyratron" $V_7$; and similarly the control grid 61 of the second "Thyratron" $V_7$ is connected to the common conductor 58 through a resistor $R_{37}$ and normally closed contacts 62 of the relay RL–5 whose actuating coil is connected to the anode of the first "Thyratron" $V_6$. In a similar manner, the control grid 63 of the third "Thyratron" $V_8$ is connected to the D. C. common conductor 58 through a resistor $R_{38}$ and normally open contacts 64 of the relay RL–8 whose actuating coil is connected to the anode of the fourth "Thyratron" $V_9$; and the control grid 65 of this fourth "Thyratron" is connected to the D. C. common conductor 58 through a resistor $R_{39}$ and normally closed contacts 66 of the relay RL–7 whose actuating coil is connected to the anode of the third "Thyratron" $V_8$. The control grid 67 of the fifth "Thyratron" $V_{10}$ is connected to the D. C. common conductor 58 through a resistor $R_{40}$ and normally closed contacts 68 of a relay RL–10 whose actuating coil is directly connected through a switch 69 to the power line $L_1$, $L_2$. All of the control grids 59, 61, 63, 65 and 67 are further connected to the same A. C. common conductor 55 as the "Thyratron" cathodes through parallel resistance-capacitance circuits comprising respectively potentiometers $R_{41}$, $R_{42}$, $R_{43}$, $R_{44}$ and $R_{45}$ and condensers $C_{15}$, $C_{16}$, $C_{17}$, $C_{18}$ and $C_{19}$.

Operation of the timer circuit is as follows: Referring initially to the first two "Thyratrons" $V_6$ and $V_7$ and their respectively associated relays RL–5 and RL–6, with both relays de-energized and their respective contacts 60 and 62 in the positions shown in Fig. 1, when the circuit is energized a negative D. C. bias is applied to the control grid 61 of the second "Thyratron" $V_7$ from the D. C. common conductor 58. This "Thyratron" is thereby prevented from conducting current, and the second relay RL–6 connected to its anode is kept from becoming energized, as a result of which the contacts 60 controlled by this relay remain open. Because they are open, the control grid 59 of the first "Thyratron" $V_6$ is held at cathode potential by virtue of its connection to the A. C. common conductor 55. The first "Thyratron" is therefore in condition to conduct, and the current flowing through it energizes the first relay RL–5 connected to its anode. Thereupon the contacts 62 which it controls are opened, disconnecting the control grid 61 of the second "Thyratron" $V_7$ from the negative D. C. common conductor 58. When this occurs, the negative bias on the control grid 61 begins to decay through the resistor-capacitor coupling $R_{42}$ and $C_{16}$ to the potential of the A. C. common conductor 55. This decay, however, takes an appreciable period of time (say from 0.1 to 2 seconds). The actual length of this period of time is determined by the setting of the slider of the potentiometer $R_{42}$, and during this time interval the second "Thyratron" $V_7$ is prevented from passing current. Eventually, however, its control grid 61 comes to (or sufficiently close to) cathode potential so as to enable the second "Thyratron" $V_7$ again to pass current. As soon as this occurs, the second relay RL–6 is energized, and promptly the contacts 60 which it controls are closed. Thereupon a negative D. C. bias is impressed on the control grid 59 of the first "Thyratron" $V_6$, and it at once ceases to pass current with the result that the first relay RL–5 is de-energized, and the contacts 62 controlled thereby are at once closed. In consequence a negative bias is again impressed on the control grid 61 of the second "Thyratron" $V_7$, stopping the passage of current through it, and the second relay RL–6 is again de-energized with the result that the contacts 60 again open.

In the foregoing series of operations (which ensue when the timer is first set in operation), the contacts 62 of the first relay RL–5 have opened without delay and subsequently closed again, and the contacts 60 of the second relay RL–6 have closed and then opened without significant delay. Now, however, the negative bias established on the control grid 59 of the first "Thyratron" $V_6$ during the momentary closure of the relay contacts 60 requires an appreciable interval of time (say from 0.1 to 2 seconds) to decay through the resistor-capacitor coupling $R_{41}$ and $C_{15}$ to sufficiently near cathode potential for the tube to become conductive. The length of time required for such decay to occur is determined by the setting of the slider on the potentiometer $R_{41}$. When finally such decay has proceeded sufficiently for the first "Thyratron" to again become conductive, the first relay RL–5 is again energized, and the contacts 62 controlled thereby are again open. The opening of these contacts marks the beginning of a new time interval during which the negative bias on the control grid 61 of the second "Thyratron" $V_7$ gradually decays to cathode potential. When this has occurred, the second relay RL–6 is again energized, its contacts 60 are closed, and the negative bias on the grid 59 of the first "Thyratron" $V_6$ is again established, with the result that the first "Thyratron" $V_6$ ceases to conduct and the first relay RL–5 is once more de-energized, opening its contacts 62.

This series of operations proceeds cyclically, with the contacts controlled by the relay RL–5 alternately opening and closing. Once operation of the circuit has reached a steady state, the length of time for which the contacts 62 of the first relay RL–5 remain closed depends on the length of time during which the first "Thyratron" $V_6$ is held by the decaying bias on its control grid from passing current, and this in turn depends on the setting of the slider of the potentiometer $R_{41}$. The length of time for which the contacts 62 of this relay are open depends on the length of time during which the first "Thyratron" $V_6$ is conducting, and this in turn depends on the length of time required for a negative bias on its control grid 61 to decay to cathode potential and permit the second relay RL–6 to again become energized, close its contacts 60, and re-establish a negative bias on the control grid 59 of the first "Thyratron." This second time interval (the length of time during which the contacts 62 of the first relay RL–5 remain open) is determined by the setting of the slider on the potentiometer $R_{42}$ in the circuit connecting the control grid 61 of the second "Thyratron" $V_7$ to the A. C. common conductor 55.

Summarizing, adjustment of the slider on the first potentiometer $R_{41}$ determines the length of time during which the contacts 62 of the first relay RL–5 are closed, and the setting of the slider on the second potentiometer $R_{42}$ determines the length of time during which these contacts are open. Thus the "on" time and "off" time of the cyclically opening and closing contacts are independently variable through adjustment of the potentiometers $R_{41}$ and $R_{42}$. An auxiliary pair of contacts 70 controlled by the actuating coil of the first relay RL–5, and which cyclically open and close with the other pair of contacts 62 of this same relay, is provided for making use of the cyclic opening and closing of the relay contacts in an external circuit.

The third and fourth "Thyratrons" $V_8$ and $V_9$, and their respectively associated relays RL–7 and RL–8, function to effect cyclic opening and closing of the contacts 66 of the third relay RL–7. The manner in which they operate is exactly the same as just described in connection with the first pair of "Thyratrons" $V_6$ and $V_7$. The length of time for which the contacts 66 remain closed is determined by the setting of the slider on the potentiometer $R_{43}$ in the circuit coupling the control grid 63 of the third "Thyratron" $V_8$ to the A. C. common conductor 55; and the length of time during which they remain open is controlled by the setting of the slider on the potentiometer $R_{44}$ in the circuit coupling the control grid 65 of the fourth "Thyratron" $V_9$ to the A. C. common conductor 55. An auxiliary pair of contacts 71 on the third relay RL–7 is provided to make use in an external circuit of its cyclic opening and closing.

The fifth "Thyratron" $V_{10}$ is not a necessary part of the timer circuit so far as controlling cyclic opening and closing the relays RL–5 and RL–7 is concerned. Rather its function is to effect closure of a pair of contacts 72 controlled by the relay RL–9 after a short time delay. When the timer circuit is initially energized, a negative D. C. bias is immediately impressed on its control grid 67 through the normally closed contacts 68 of the relay RL–10, and thereby this "Thyratron" is prevented from passing current. When the switch 69 is closed, thereby energizing the relay RL–10 directly from the power line $L_1$, $L_2$, the contacts 68 controlled by this relay are opened, and after a period of time (say from 0.1 to 2 seconds) determined by the setting of the slider on the potentiometer $R_{45}$, the negative bias on the control grid 67 decays sufficiently so that the fifth "Thyratron" $V_{10}$ begins to conduct current. Consequently, after this time delay, the actuating coil of the relay RL–9 is energized and the contacts 72 controlled thereby are closed. They remain closed thereafter for so long as the switch 69 is kept closed. When the switch 69 is again open, de-energizing the coil of relay RL–10, the contacts 68 of this relay close at once, a negative D. C. bias is thereby restored on the control grid 67 of the fifth "Thyratron" $V_{10}$, and the contacts 72 of relay RL–9 open without significant delay. An auxiliary pair of contacts 73 controlled by the actuating coil of relay RL–10 are provided in the circuit shown in Fig. 1 for electric interlocking with the contacts 72 of relay RL–9, but this feature is not necessary to operation of the circuit.

*Relay circuit*

The relay circuit shown in Fig. 1 serves to control the opening and closing of pairs of normally open contacts 74 and 75 actuated respectively by the coils of two main relays RL–11 and RL–12. For purposes of illustration, the relay circuit is described below as applied to controlling motion toward and away from each other of a pair of rolls of a rolling mill. It may be assumed that the rolls are screwed toward each other by a motor which is energized when the first main relay contacts 74 are closed, and are screwed apart when another motor is energized (or the same motor is run in the reverse direction) as a result of closing the second main relay contacts 75. Movement of the rolls toward or away from each other is determined in accordance with whether the metal sheet being rolled is too thick or too thin as it emerges from the rolls, the thickness of the sheet (or the extent to which its thickness departs from some standard value) being measured by the electrical gauge whose output is connected to the control circuit.

The relay circuit is shown in Fig. 1 in the condition in which both of the main relays RL–11 and RL–12 are de-energized. One side of each of these relays is directly connected to one side $L_2$ of the power line. The other side of the first main relay RL–11, however, is open-circuited through the normally open contacts 76 of the first primary response relay RL–1, and the other side of the second main relay RL–12 is open-circuited through the normally open contacts 77 of the second primary response relay RL–2. The condition under which both primary response relays RL–1 and RL–2 are de-energized, so that both pairs of contacts 76 and 77 are open, corresponds to the condition when the sheet metal emerging from between the rolls of the rolling mill is of the desired thickness, and when the signal voltage delivered by the thickness-measuring gauge to the control circuit is therefore substantially equal to the reference voltage supplied thereto.

As a first example, let it be assumed that the metal emerging from the rolls becomes just a little thicker than it should be, that as a result the signal voltage supplied by the gauge to the control circuit becomes a little more than the reference voltage, and that consequently only the first primary response relay RL–1 is energized as described above in connection with the control circuit. Thereby the contacts 76 of the first primary response relay RL–1 close, and complete a circuit from the first main relay RL–11 through pairs of normally closed contacts 78, 79 and 80 on the relays RL–2, RL–3 and RL–4, respectively, to the cyclically opening and closing contacts 70 of the first timer relay RL–5. If the switch 69 has been closed for an appreciable length of time (say for at least several seconds), then each time the contacts 70 close, the circuit is completed through the relay contacts 73 and 72, and through a manually operated power switch 81, to the side $L_1$ of the power line opposite that to which the main relay RL–11 is directly connected. Thereupon, and for so long as the thickness of the metal remains a little greater than desired, the actuating coil of the first main relay RL–11 receives a series of energizing impulses of timed duration corresponding to the cyclic opening and closing of the contacts 70. Thereby the contacts 74 of the first main relay are cyclically opened and closed, with the result that the roll screwdown motor receives a series of power impulses such as to cause the rolls to be moved together. The timing cycle of the contacts 70 is preset (by adjustment of the potentiometers $R_{41}$ and $R_{42}$) to give a relatively short "on" time and a relatively long "off" time, so that the rolls are brought gradually together, and do not close so rapidly as to overshoot their proper setting and make the metal too thin. When the metal is again of the correct gauge thickness, the first primary response relay RL–1 again becomes de-energized, and thereby its contacts 76 are again opened, so that the roll screwdown motor receives no further power impulses.

As a second example, if the metal, instead of being only a little too thick, should become considerably too thick, then in the manner described above in connection with the control circuit, the first primary response relay RL–1 and also the first secondary response relay RL–3 will both become energized. In this event, the contacts 76 will close as in the first example, but the normally closed contacts 79 on the first secondary response relay RL–3 will open and concurrently a pair of normally open contacts 82 on this same relay will close. Thereby the circuit from the actuating coil of the first main relay RL–11 is completed through the contacts 76, 78 and 82 of the relays RL-1, RL-2 and RL-3, respectively, to the cyclically opening and closing contacts 71 of the second timer relay RL-7 (cutting the first timer relay RL-5 out of the circuit), and therefrom through the contacts 73 and 72 of relays RL-10 and RL-9, respectively, and through the manually controlled switch 81, to the side L₁ of the power line. The cyclic opening and closing of the contacts of the second timer relay RL-7 is pre-adjusted (by the setting of the potentiometers $R_{43}$ and $R_{44}$) so that its "on" time is relatively long and its "off" time is relatively short as compared with the first timer relay RL-5. Accordingly, so long as the first secondary response relay RL-3 remains energized, the main relay RL-11 receives a series of rather long duration energizing pulses, with only short intervals of time between these pulses. The contacts 74 of this main relay close and open correspondingly, delivering to the roll screwdown motor a series of closely spaced power impulses of relatively long duration, with the result that the rolls are brought rather rapidly together to make a rapid correction of their setting.

When the rolls have been brought close enough together so that the thickness of the emerging metal is only a little greater than it should be, the first secondary response relay becomes de-energized, restoring its contacts 79 and 82 to the positions shown in Fig. 1, while the first primary response relay remains energized, holding its contacts 76 closed. Thereupon the energization of the first main relay RL-11 becomes effected through the contacts of the first timer relay RL-5, as described in the first example, and this main relay is in consequence energized with power impulses of the shorter duration and with the longer interval between them that is determined by the opening and closing cycle of the first timer relay RL-5. The roll screwdown motors continue to operate, therefore, but with a timed series of power impulses that cause them to move the rolls together more slowly than when the first primary response relay RL-3 was energized. The ensuing actuation of the roll screwdown motors continues in the manner previously described until the thickness of the metal is again at the desired value.

The preceding examples have been given with respect to metal that is assumed to be too thick as it emerges from between the rolls. If the metal is too thin, then the electrical guage impresses on the control circuit a signal voltage that is less, instead of greater, than the reference voltage. In such case it is the second primary response relay RL-2 rather than the first such relay RL-1 that is energized by the control circuit, and accordingly it is the second main relay RL-12 rather than the first such relay RL-11 that receives actuating impulses. Otherwise, however, the operation of the relay circuit is the same as described above. When only the second primary response relay RL-2 is energized, the circuit through the second main relay RL-12 is completed through the normally closed contacts 79 and 80 of the secondary response relays RL-3 and RL-4 and through the cyclically opening and closing contacts 70 of the first timer relay RL-5. When the metal is considerably too thin, so that the second secondary response relay RL-4 is energized along with the second primary response relay RL-2, the normally closed contacts 80 of the former are opened and a pair of normally open contacts 83 with which it is provided are closed. Thereupon the circuit through the coil of the second main relay RL-12 is completed through the cyclically opening and closing contacts 71 of the second timer relay RL-7, cutting the contacts 70 of the first timer relay out of the circuit. In either case, the second main relay RL-12 receives current pulses through the contacts of whichever of the timer relays is effectively connected in circuit with it, and the contacts 75 of the second main relay RL-12 are caused to open and close correspondingly to supply power impulses to the roll screwdown motor in such manner as to cause the rolls to move away from one another, thus correcting the condition which made the strip too thin.

*Circuit elements*

The relays used in the relay circuit are of conventional design for operation at the particular voltages used. The manual switch 81 in the circuit through which the main relays RL-11 and RL-12 are connected to the power line is provided to permit disconnecting the main relays without shutting off the power to the control and timer circuits. When the control system is used for controlling the operation of a rolling mill, the switch 69 in series with the actuating coil of relay RL-10 is advantageously a normally closed relay switch the coil of which is actuated when a photoelectric cell is energized. Such photoelectric cell may be mounted in position where the beam of light by which it is activated is interruped by the passage of metal through the rolls. With this arrangement, the contacts 72 and 73 through which the main relays are energized are closed only when metal is actually passing through the rolls. Consequently a false reading of "too thin" from the thickness-measuring gauge when no metal is passing through the rolls does not result in energizing the roll screwdown motors.

Following is a list of the electron tube types, resistor values and capacitor values used in a successful control circuit and in a successful timer circuit of the nature described above in connection with Fig. 1, and both designed to be energized from a conventional 60 cycle, 110 volt A. C. power supply delivered through the power line L₁, L₂:

Electron tubes:
    Control circuit—
        $V_1$—Type 5Y3
        $V_2$—Type VR105
        $V_3$—Type 6SL7
        $V_4$, $V_5$—Type 6N7
    Timer circuit—
        $V_6$, $V_7$, $V_8$, $V_9$, $V_{10}$—Type GL502A Resistors (K. denotes resistance in units of 1000 ohms; meg. denotes resistance in megohms; w. denotes power rating in watts):

Control circuit—
        $R_1$, $R_2$—10 K., 10 w.
        $R_3$—100 ohms potentiometer
        $R_4$—500 K., 1 w.
        $R_5$—0.1 K., 1 w.
        $R_6$, $R_7$—6.8 K., 1 w.
        $R_8$, $R_9$—470 K., 1 w.
        $R_{10}$, $R_{11}$—47 K., 1 w.
        $R_{12}$, $R_{15}$—10 K. potentiometers
        $R_{13}$, $R_{14}$, $R_{16}$, $R_{17}$—1.5 K., 1 w.
        $R_{18}$, $R_{19}$, $R_{20}$, $R_{21}$—1 meg., ½ w.
        $R_{22}$—2 meg., ½ w.
    Timer circuit—
        $R_{35}$, $R_{36}$, $R_{37}$, $R_{38}$, $R_{39}$, $R_{40}$—22 ohms, 1 w.
        $R_{41}$, $R_{42}$, $R_{43}$, $R_{44}$, $R_{45}$—200 K. potentiometers Capacitors (mfd. denotes capacitance in microfarads; v. denotes voltage rating):

Control circuit—
        $C_1$, $C_2$—6 mfd., 600 v.
        $C_3$, $C_4$, $C_5$, $C_6$, $C_7$—0.05 mfd., 400 v.
        $C_8$—0.3 mfd., 600 v.
        $C_9$, $C_{10}$—25 mfd., 250 v.
        $C_{11}$, $C_{12}$—6 mfd., 600 v.
        $C_{13}$—8 mfd., 600 v.
    Timer circuit—
        $C_{15}$, $C_{16}$, $C_{17}$, $C_{18}$, $C_{19}$—0.5 mfd., 600 v.
        $C_{20}$—6 mfd. 600 v.

We claim:

1. In a control system of the character described, the combination comprising a pair of impedances of the same kind coupled together each at one end through a first point and coupled together each at the other end through a second point to form a closed alternating-current circuit, an alternating-current power source, means for deriving an alternating reference voltage from said power source and for impressing said voltage substantially exclusively on one of said impedances, means for impressing substantially exclusively on the other of said impedances an alternating signal voltage derived from a signal source external to said system, means for maintaining one of said voltages in phase with the voltage of said power source, means for maintaining the other of said voltages in phase opposition to the voltage of said power source, the potentials developed across said impedances being effectively aiding so that said potentials, if equal, balance each other to produce at said first point with respect to said second point substantially zero control voltage, or, if unequal, produce at said first point with respect to said second point a control voltage of phase determined by the greater of said reference and signal voltages, thermionic switching means having two parallel-connected control grids, two anodes and at least one cathode, coupling means coupling said grids to said first point, means connecting said cathode to said second point, a first relay connected between one anode of said switching means and a phase point of said power source at which the voltage is in phase with one of said reference and signal voltages, a second relay connected between the other anode of said switching means and a point of opposite phase of said power source, and circuit means completing the connections between said power source and said switching means.

2. A control system according to claim 1 which includes an alternating control voltage source and means maintaining the control voltage in one of two fixed phase relations with the voltage of the power source, and in which said thermionic switching means comprises separate primary and secondary grid-controlled switching means, and in which said relays comprise first and second primary response relays having actuating coils connected, respectively, between the first and second anodes of the primary switching means and two opposite phase points of said power source, and first and second secondary response relays having actuating coils connected, respectively, between the first and second anodes of the secondary switching means and said two opposite phase points of said power source, first circuit means including the grid and cathode of said primary switching means, a source of direct-current potential and a first potentiometer connected thereto and to said primary switching means for establishing an effective grid bias of a certain value on said primary switching means, second circuit means including the grid and cathode of said secondary switching means, and a second potentiometer connected to said source of direct-current potential and to said secondary switching means for establishing on said secondary switching means an effective grid bias of a value greater than said first value, and additional circuit means completing the connections between the relays and the two switching means, whereby whenever the signal voltage differs from the reference voltage by an initial value as determined by the setting of the first potentiometer one of the primary response relays is actuated, and whenever the signal voltage differs from the reference voltage by a second value larger than said initial value and as determined by the setting of the second potentiometer one of the secondary response relays is actuated.

3. In a control system of the character described, the combination comprising a pair of impedances of the same kind, a closed alternating-current circuit in which said impedances are connected in series with each other, an alternating-current power source, means for impressing an alternating reference voltage substantially exclusively on one of said impedances, means for impressing substantially exclusively on the other of said impedances an alternating signal voltage derived from a signal source external to said system, means for maintaining one of said voltages in phase with the voltage of said power source, means for maintaining the other of said voltages in phase opposition to the voltage of said power source, an amplifier of the type of which the output is of the same phase as the input and having a control electrode connected to a point in said circuit between said impedances at which the voltages respectively developed across said impedances are added to form a control voltage of phase determined by the greater of said reference and signal voltages, thermionic switching means having two control grids, two anodes and at least one cathode, said grids being connected in parallel to the output of said amplifier, a first relay connected between one of said anodes and one phase point of said power source at which the voltage is in phase with one of said reference and signal voltages, a second relay connected between the other of said anodes and a point of opposite phase of said source, circuit means completing the connections of said amplifier and circuit means completing the connections between said power source, said amplifier and said switching means.

4. A control system according to claim 3 in which said thermionic switching means comprises separate primary and secondary grid-controlled switching means, and in which said relays comprise first and second primary response relays having actuating coils connected, respectively, between first and second anodes of the primary switching means and said two opposite phase points of said power source, and first and second secondary response relays having normally open contacts and having actuating coils connected, respectively, between the first and second anodes of the secondary switching means and said two opposite phase points of said power source, first circuit means including the grid and cathode of said primary switching means, a source of direct-current potential and a first potentiometer connected thereto and to said primary switching means for establishing an effective bias of a certain value on the grid of said primary switching means, second circuit means including the grid and cathode of said secondary switching means, and a second potentiometer connected to said source of direct-current potential and to said secondary switching means for establishing on the grid of said secondary switching means an effective bias of a value greater than said first value, and additional circuit means completing the connections from the relays and the amplifier to the two switching means, whereby whenever the signal voltage differs from the reference voltage by an initial value as determined by the setting of the first potentiometer one of the primary response relays is actuated, and whenever the signal voltage differs from the reference voltage by a second value larger than said initial value and as determined by the setting of the second potentiometer one of the secondary response relays is actuated.

5. A control system according to claim 4 which includes in addition to said primary and secondary response relays, a main relay having an actuating coil, a timer relay having contacts and an actuating coil, means connected to said last-named coil operative cyclically to open and close said contacts, circuit means connecting the main relay actuating coil through the normally open contacts of the primary response relay and through the contacts of the timer relay to said power source and connecting the actuating coil of the main relay through the normally open contacts of the secondary response relay to said power source through contacts of said timer relay.

6. A control system according to claim 5 in which said timer relay constitutes a first timer relay, said system including a second timer relay having contacts and an actuating coil, means connected to said last-named coil operative cyclically to open and close the contacts of the second timer relay with a period of closure relatively longer than that of the first timer relay, and circuit means connecting the main relay actuating coil through the normally open contacts of the primary response relay and through the contacts of the first timer relay to said power source and connecting the main relay actuating coil through the normally open contacts of the secondary response relay and through the contacts of the second timer relay to said power source.

7. A control system according to claim 1 which includes a pair of similar vibrators each having an actuating coil and an armature, both of said actuating coils being connected to said power source whereby both of said armatures vibrate in synchronism, said source of signal voltage and said source of reference voltage being of the direct current type, said signal voltage being connected to the armature of one of said vibrators and said reference voltage being connected to the armature of the other of said vibrators, each vibrator having a pair of contacts oppositely disposed with respect to the armature thereof so as alternately to contact the same, connections from one pair of vibrator contacts to separated points on one of said impedances and connections from the other pair of vibrator contacts to separated points on the other of said impedances.

8. A control system according to claim 7, in which said impedances comprise a pair of transformers each having a primary winding and a secondary winding, said source of signal voltage being connected to the primary of one transformer and said source of reference voltage being connected to the primary of the other transformer, circuit means connecting one end of each of the secondary windings of said transformers to one of said points, circuit means connecting the other end of each of said secondary windings to the other of said points, circuit means coupling one of said points to said grids and circuit means coupling the other of said points to the cathodes of said switching means.

9. A control system according to claim 3 in which said impedances have terminals and which includes first and second vibrating conductors mounted for oscillation, respectively, between first and second pairs of contacts co-operating therewith, a source of direct-current reference voltage connected to said first vibrating conductor and a source of direct-current signal voltage connected to said second vibrating conductor, said first pair of contacts being connected to the terminals of said first impedance and said second pair of contacts being connected to the terminals of said second impedance, whereby alternating reference and signal voltages are impressed across the first and second impedances, respectively, when said vibrating conductors are oscillated between their respective pairs of contacts, and at least one electromagnet connected to said alternating-current power source and arranged to actuate said vibrating conductors, whereby vibration of the conductors is synchronized and the alternating-current reference and signal voltages are each maintained at a fixed frequency and phase relation with respect to the voltage of the power source.

10. A control system according to claim 3 in which said thermionic switching means includes first and second grid-controlled switching means each having at least one grid, one anode and one cathode, their grids being connected to the output of said amplifier, a primary response relay having an actuating coil connected between the anode and one of said switching means and one phase point of said power source, a secondary response relay having an actuating coil connected between the anode of the other of said switching means and the same phase point of said power source, first circuit means including the grid and cathode of a first of said switching means, a source of direct-current potential and a first potentiometer connected thereto and to said first switching means for establishing an effective bias of a certain value on the grid of said first switching means, second circuit means including the grid and cathode of a second of said switching means, and a second potentiometer connected to said source of direct-current potential and to said second switching means for establishing an effective bias of a value greater than said first value on the grid of said second switching means, and additional circuit means completing the connections from said relays and the amplifier to the two switching means, whereby when the magnitude of the difference voltage between the signal voltage and the reference voltage exceeds an initial value determined by the setting of the first potentiometer the primary response relay is actuated, and when the magnitude of said difference voltage exceeds a second value larger than said initial value determined by the setting of the second potentiometer the secondary response relay is actuated.

11. A control system according to claim 1 in which said impedances comprise a pair of similar resistors and which includes connecting means for symmetrically impressing said reference and signal voltages on said resistors, respectively.

12. In a control system of the character described, the combination comprising a pair of impedances of the same kind coupled together each at one end through a first point and coupled together each at the other end through a second point to form a closed alternating-current circuit, an alternating-current power source, means for deriving an alternating reference voltage from said power source and for impressing said voltage substantially exclusively on one of said impedances, means for impressing substantially exclusively on the other of said impedances a signal voltage derived from a signal source external to said system, means for maintaining one of said voltages in phase with the voltage of said power source, means for maintaining the other of said voltages in phase opposition to the voltage of said power source, the voltages developed across said impedances being connected with respect to said two points such that said last-named voltages, if equal, balance each other to form at said first point with respect to said second point substantially zero control voltage or, if unequal, to form at said first point with respect to said second point a control voltage of phase determined by the greater of said reference and signal voltages, thermionic switching means having two parallel-connected control grids, two anodes and at least one cathode, coupling means coupling said grids to said first point, means connecting said cathode to said second point, a first relay connected between one anode of said switching means and a phase point of said power source at which the voltage is in phase with one of said reference and signal voltages, a second relay connected between the other anode of said switching means and a point of opposite phase of said power source, and circuit means completing the connections between said power source and said switching means.

13. In a control system of the character described, the combination comprising a pair of impedances of the same kind coupled together each at one end through a first point and coupled together each at the other end through a second point to form a closed alternating current circuit, an alternating current power source, means for deriving an alternating reference voltage from said power source and for impressing said voltage substantially exclusively on one of said impedances, means for impressing substantially exclusively on the other of said impedances a signal voltage derived from a signal source external to said system, means for maintaining one of said voltages in phase with the voltage of said power source, means for maintaining the other of said voltages in phase opposition to the voltage of said power source, the voltages developed across said impedances being connected with respect to said two points such that said last-named voltages, if equal, balance each other to form at said first point with respect to said second point substantially zero control voltage or, if unequal, to form at said first point with respect to said second point a control voltage of phase determined by the greater of said reference and signal voltages, and thermionic control means connected to said two points and actuated in response to the phase and magnitude of said control voltage.

References Cited in the file of this patent

UNITED STATES PATENTS

| Number | Name | Date |
|---|---|---|
| 1,512,008 | Otis | Oct. 14, 1924 |
| 1,942,587 | Whitman | Jan. 9, 1934 |
| 1,969,536 | Winne | Aug. 7, 1934 |
| 2,095,124 | Cockrell | Oct. 5, 1937 |
| 2,134,901 | Wey | Nov. 1, 1938 |
| 2,275,509 | Dahlstrom | Mar. 10, 1942 |
| 2,366,500 | Eastin | Jan. 2, 1945 |
| 2,413,120 | Swanson | Dec. 24, 1946 |
| 2,428,126 | Nicholson | Sept. 30, 1947 |
| 2,456,420 | Jackson | Dec. 14, 1948 |
| 2,467,454 | Arnot | Apr. 19, 1949 |
| 2,506,531 | Wild | May 2, 1950 |
| 2,581,525 | Gaddis | Jan. 8, 1952 |